US010124716B1

(12) United States Patent
Gauthier

(10) Patent No.: US 10,124,716 B1
(45) Date of Patent: Nov. 13, 2018

(54) AUTOMATED HIGH BEAM HEADLIGHT OPERATION

(71) Applicant: Toyota Motor Engineering & Manufacturing North America, Inc., Plano, TX (US)

(72) Inventor: Christopher T. Gauthier, Saline, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 0 days.

(21) Appl. No.: 15/702,725

(22) Filed: Sep. 12, 2017

(51) Int. Cl.
*B60Q 1/14* (2006.01)

(52) U.S. Cl.
CPC ........ *B60Q 1/143* (2013.01); *B60Q 2300/122* (2013.01); *B60Q 2300/312* (2013.01); *B60Q 2300/314* (2013.01); *B60Q 2300/322* (2013.01); *B60Q 2300/324* (2013.01); *B60Q 2300/41* (2013.01); *B60Q 2300/42* (2013.01); *B60Q 2300/45* (2013.01); *B60Q 2300/47* (2013.01)

(58) Field of Classification Search
CPC ...... B60Q 1/143; B60Q 1/1423; B60Q 1/085; B60Q 2300/00; B60Q 2300/031; B60Q 2300/0312; B60Q 2300/05; B60Q 2300/045; B60Q 2300/047
See application file for complete search history.

(56) References Cited

U.S. PATENT DOCUMENTS

| 6,403,942 | B1* | 6/2002 | Stam | ...................... | B60Q 1/085 250/208.1 |
|---|---|---|---|---|---|
| 6,480,806 | B1 | 11/2002 | Bilz | | |
| 6,831,261 | B2 | 12/2004 | Schofield | | |
| 7,241,034 | B2 | 7/2007 | Smith | | |
| 8,070,332 | B2 | 12/2011 | Higgins-Luthman | | |
| 9,045,081 | B2* | 6/2015 | Kuhl | ........................ | B60Q 1/10 |
| 9,744,899 | B2* | 8/2017 | Akiyama | ................ | B60Q 1/12 |
| 2008/0100139 | A1* | 5/2008 | Michiyama | .......... | B60Q 1/1423 307/10.8 |
| 2008/0259619 | A1* | 10/2008 | Tyll | ...................... | B60Q 1/0005 362/464 |
| 2011/0012511 | A1* | 1/2011 | Watanabe | .............. | B60Q 1/085 315/82 |

OTHER PUBLICATIONS

Volkswagen, "VW Automatic Headlight Range Control", http://en.volkswagen.com/en/innovation-and-technology/technical-glossary/automatische_leuchtweitenregulierung.html, date 2017, 8 pages.

* cited by examiner

Primary Examiner — Thai Pham
(74) Attorney, Agent, or Firm — Sheppard Mullin Richter & Hampton LLP; Hector A. Agdeppa; Daniel N. Yannuzzi

(57) ABSTRACT

Systems and methods are provided for automatically turning off the high beam headlights of a vehicle. In one embodiment, the system may include an electronic control unit for adjusting the operation of the high beam headlights. The electronic control unit may detect whether the headlights are operating in a high beam mode. Additionally, the electronic control unit may receive data regarding at least one of an environmental condition, a road condition, and a driving condition from one or more cameras, sensors, and information systems associated with a vehicle. The headlights may then be switched to the low beam mode when it is determined that the likelihood of at least one of the environmental condition, the road condition, and the driving condition meets or exceeds a threshold condition.

17 Claims, 5 Drawing Sheets

AUTOMATED HIGH BEAM HEADLIGHT OPERATION

TECHNICAL FIELD

The present disclosure relates generally to high beam headlight operation, and in particular, some embodiments relate to adjusting high beam headlight operation in response to a variety of environmental, road, and driving conditions.

DESCRIPTION OF RELATED ART

High beam headlights allow for enhanced visibility of the road ahead when road conditions become too dark. For example, if there are few or no streetlights on the road, turning on the high beam headlights may help a driver see farther down the road, and thus prevent the driver from veering off the road or hitting any objects.

However, because high beam headlights give bright, long-range illumination, they can blind drivers of oncoming vehicles, as well as the drivers of those immediately preceding the high beam headlight vehicle driver. Furthermore, high beam headlights can also blind the high beam headlight vehicle driver when the lights reflect off of/back from objects, such as road signs, water droplets (e.g., in misty or foggy conditions), etc. As a result, high beam headlights should also be turned off when approaching reflective objects, such as road signs, and when driving in wet weather conditions.

While it may not be the intention of the driver to blind other drivers or himself with the glare from the high beam headlights, drivers must be vigilant when encountering various environmental, road, and/or driving conditions in order to prevent such glare. As a result, the automation of turning off high beam headlights may relieve the driver from having to constantly determine whether the headlights should be kept on or turned off.

BRIEF SUMMARY OF THE DISCLOSURE

Disclosed herein are embodiments directed to high beam operation. In one embodiment, the method may include determining whether headlights are operating in a high beam mode; receiving data regarding at least one of an environmental condition, a road condition, and a driving condition from one or more cameras, sensors, and information systems associated with a vehicle; identifying a likelihood that at least one of the environmental condition, the road condition, and the driving condition warrants switching the headlights to a low beam mode upon a determination that the headlights are operating in the high beam mode; and switching the headlights to the low beam mode upon a determination that the likelihood of the at least one of the environmental condition, the road condition, and the driving condition warranting switching the headlights to the low beam mode meets or exceeds a threshold condition.

In further embodiments, the method may also include environmental conditions that include at least one of wet weather, vehicle traffic, pedestrian traffic, road signs, reflective objects, light rays, and reflected light rays. In some embodiments, the road conditions may include a curved or hilly section of road. In further embodiments, the driving conditions may include one or more objects within 600-700 feet in front of or alongside the vehicle.

In further embodiments, the object may include a reflective object, an oncoming vehicle, and a preceding vehicle. Additionally, the camera may include at least one of a still camera, a video camera, and a thermographic camera. Furthermore, the sensors may include at least one of a radar sensor, a motion detection sensor, a light sensor, a steering wheel sensor, and a moisture detection sensor. In some embodiments, the information system may include at least one of a navigation system, a Bluetooth system, a vehicle-to-infrastructure communication system, and a vehicle-to-vehicle communication system. Furthermore, the threshold condition may include a condition in which light is sensed by the vehicle in conjunction with the at least one of the environmental condition, road condition, and driving condition.

Also disclosed herein are embodiments directed to a system for operating headlights. In one embodiment, the system may include a pair of headlights that include a high beam mode and a low beam mode; an electronic control unit for adjusting the operation of the headlights, where the electronic control unit: detects whether headlights are operating in a high beam mode; receives data regarding at least one of an environmental condition, a road condition, and a driving condition from one or more cameras, sensors, and information systems associated with a vehicle; identify a likelihood that at least one of the environmental condition, the road condition, and the driving condition warrants switching the headlights to a low beam mode upon a determination that the headlights are operating in the high beam mode; and switch headlights to the low beam mode upon a determination that the likelihood of at least one of the environmental condition, the road condition, and the driving condition warranting switching the headlights to the low beam mode meets or exceeds a threshold condition.

In some embodiments, the environmental condition includes at least one of wet weather, vehicle traffic, pedestrian traffic, road signs, reflective objects, light rays, and reflected light rays. In further embodiments, the road condition includes a curved or hilly section of road. Furthermore, the driving condition may include a distance between the vehicle and an object within a range of 600-700 feet, wherein the object comprises at least one of a reflective object, an oncoming vehicle, and a preceding vehicle.

In further embodiments, the cameras may include at least one of a still camera, a video camera, and a thermographic camera. Additionally, by way of example, the sensors may include at least one of a radar sensor, a motion detection sensor, a light sensor, a steering sensor, and a moisture detection sensor. In some embodiments, the information system may include at least one of a navigation system, a Bluetooth system, and vehicle-to-infrastructure communication system, and a vehicle-to-vehicle communication system. Furthermore, the threshold condition may include a condition in which light is sensed by the vehicle in conjunction with the at least one of the environmental condition, road condition, and driving condition.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

Figure 1:
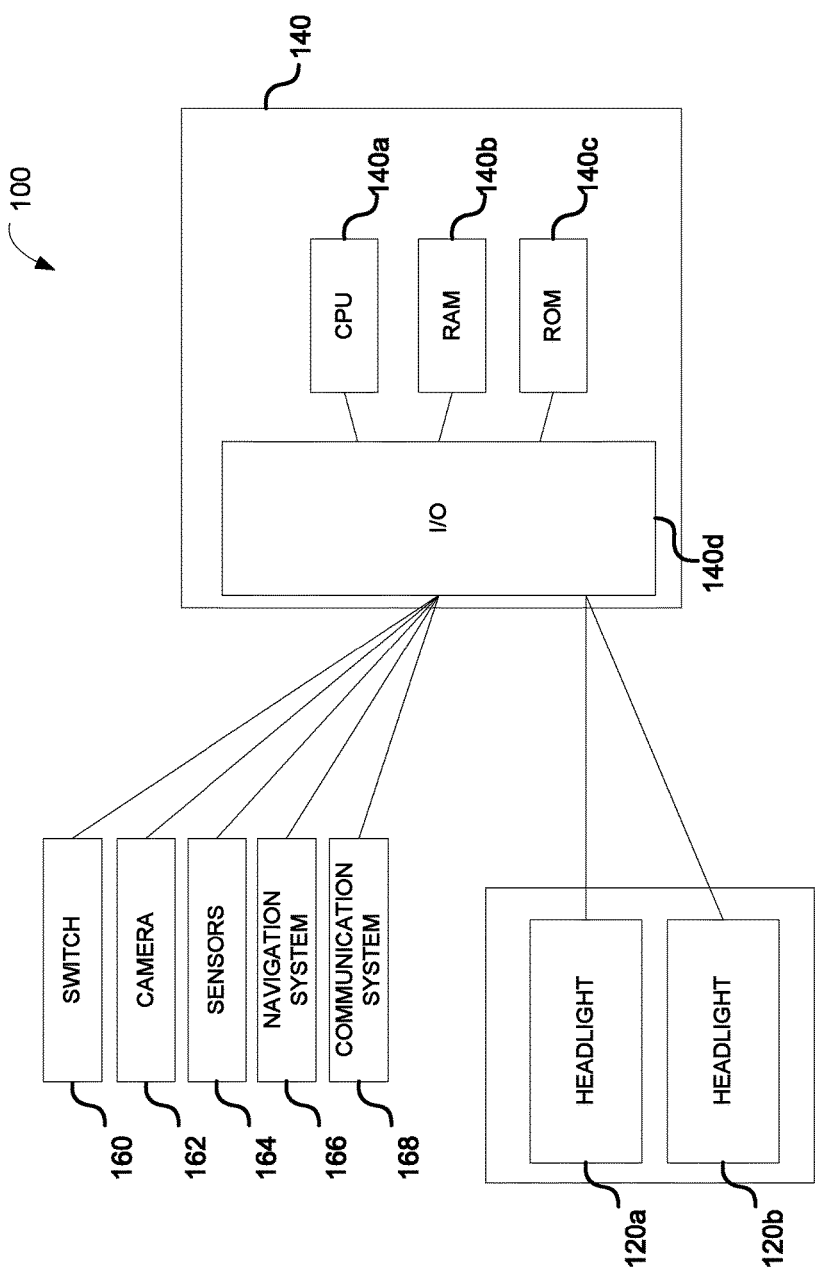
FIG. 1 is a schematic representation of a vehicle high beam headlight lighting system.

The figures are not exhaustive and do not limit the present disclosure to the precise form disclosed.

DETAILED DESCRIPTION

Embodiments of the systems and methods disclosed herein can recognize environmental, road, and driving conditions. Based upon one or more of these conditions, use and/or adjustment of a vehicle's high beam headlights may be controlled. In one embodiment, high beam headlights may be configured to automatically turn off (when warranted) based upon one or more identified environmental, road, and/or driving conditions. It should be noted that depending on how the high beam headlights are implemented in a vehicle, turning off high beam headlights may refer to switching headlight operation from high beam to low beam mode.

For example, such environmental conditions that may result in turning off the high beam headlights may include, but are not limited to wet weather, vehicle traffic, pedestrian traffic, presence of reflective road signs, presence of reflective objects, presence of reflected light rays, presence of light rays, and the like. Because these conditions can result in headlight glare, the high beam headlights may be turned off when approaching and/or experiencing these environmental conditions.

Additionally, the detection of certain exemplary road conditions may be considered a basis for turning off the high beam headlights. For example, roads that curve and/or have hilly sections can make it difficult, or even impossible, to see oncoming vehicles or any preceding vehicles that may be impacted by high beam headlights. As a result, the high beam headlights may be automatically turned off when approaching such road conditions in order to assure safe driving conditions to all drivers sharing the road.

Furthermore, the high beam headlights may turn off when certain driving conditions are identified. Such driving conditions may include factoring a vehicle's speed and distance with respect to an identified object immediately ahead. For example, vehicle speed may be a factor that impacts the likelihood that the vehicle will encounter a pedestrian. That is, high cruising speeds may indicate the driver is travelling on a highway where pedestrians are not present, while lower speeds may indicate the driver is travelling on an urban street, and more likely to approach an intersection where pedestrians may be crossing.

Furthermore, distance may be a consideration in determining an appropriate time at which to shut off the high beam headlights. For example, if a driver is very slowly or very quickly decelerating to stop at an intersection where pedestrians have been identified, the high beam headlights may shut off when a predetermined distance between the driver and the pedestrian or object ahead is achieved. This may ensure that the high beam headlights are turned off at the appropriate distance so that the headlights do not blind or impair the pedestrian while still providing enhanced illumination for as long as possible to the driver. Thus, speed and distance may be additional factors for consideration to determine the proper timing for shutting off the high beam headlights.

In some instances, certain vehicle devices and systems may be utilized to detect and identify these specific environmental, road, and/or driving conditions. Thus, when these specific environmental, road, and/or driving conditions are detected, the high beam headlights may be turned off. By way of example, to detect for such conditions, vehicle devices and systems may include one or more sensors (e.g., radar sensors, motion detection sensors, light sensors, a steering wheel sensor, and moisture detection sensors), cameras (e.g., still camera, video camera, and thermographic camera), navigation systems, and communication systems (e.g., a Bluetooth system and vehicle-to-vehicle communication system).

FIG. 1 is a schematic representation of a vehicle high beam lighting system 100. The vehicle lighting system 100 may include headlights 120a/b, which may include high beam headlights. The high beam headlights 120a/b may be connected to an electronic control unit ("ECU") 140, where the ECU controls the turning on and turning off of the high beam headlights 120a/b.

In some instances, the ECU 140 may include a CPU 140a, a RAM 140b, a ROM 140c, and an I/O module 140d. The RAM 140b and ROM 140c may be used as, for example, memory storage devices to store tables and instructions listing conditions and threshold requirements for when to automatically shut off the high beam headlights 120a/b. By way of example, the tables and instructions may provide one or more combination of environmental, road, and driving conditions that must be satisfied for the ECU 140 to automatically shut off the high beam headlights.

Additionally, the CPU 140a may perform various computations from the data gathered by the vehicle sensors, cameras, navigation systems, and communications systems. Such computations may include determining the probability or likelihood the vehicle is approaching certain environmental and road conditions requiring the high beam headlights 120a/b to be turned off. Such environmental and road conditions may include the vehicle approaching or the likelihood of approaching objects or experiencing events. This may include, an oncoming vehicle, encountering a preceding vehicle, wet weather conditions, reflective road signs, pedestrians, etc. By way of example, determining the probability or likelihood of approaching such conditions may be determined by analyzing the one or more data gathered by the vehicle sensors, cameras, navigation systems, and communications systems. When the CPU 140a determines that the probability indicates the likelihood of meeting such conditions immediately ahead, the ECU 140 may then control headlights 120a/b accordingly, e.g., switching headlights 120a/b from high beam mode to low beam mode.

The I/O module 140d may be connected to various vehicle components, devices, and systems to detect certain environmental, road, and/or driving conditions that require the high beam headlights 120a/b to be turned off, as discussed above. For example, the I/O module 140d may be connected to a switch 160, cameras 162, sensors 164, navigation systems 166, and communication systems 168. These various vehicle components may be used alone or in combination to detect the select environmental, road, and/or driving conditions in real time.

The switch 160 turns the high beam headlights 120a/b on or off in accordance with commands received from the CPU 140a. The cameras 162 may be mounted in the interior and/or on exterior sections of the vehicle. In some embodiments, the cameras 162 may be a still camera and/or video camera that may capture images and videos of the front, sides, and rear surrounding areas of the vehicle. By way of example, the cameras may be oriented to take images and videos of preceding vehicles and oncoming vehicles in front of the vehicle, as well as pedestrians, objects, and other vehicles located within the general vicinity of the vehicle.

In some instances, the cameras 162 may also detect and locate light emissions (e.g., street lights, approaching headlights from an oncoming vehicle, etc.) and light reflections (e.g., reflectors, reflections from a sign post, etc.). The detected light emissions and light reflections may indicate the likelihood of an approaching vehicle or the presence of a reflective road sign, and thus require the high beam headlights to be shut off. For example, the CPU 140a may take the image shots from the camera 162 and detect the pixels and their respective values to determine if there are any areas of brightness. Thus, when the camera 162 detects a minimum threshold of light emissions or light reflections via pixel values, the ECU 140 may automatically shut off the high beam. By way of example, when the pixel values ranging anywhere from 4 pixel to the max pixel of the camera 162 are detected, these values may be associated with the presence of a light source or reflected light.

However, it should be noted that the detection of light emissions and light reflections alone may be insufficient to determine whether such light rays are coming from a vehicle or reflected back from a reflective object (e.g., reflective road sign). As a result, the ECU 140 may require that additional data is provided by the other cameras, sensors, and systems to determine the likelihood that the light ahead is from an approaching vehicle, pedestrian, or reflective object. When the additional data is analyzed by the CPU 140a and determines that there is sufficient probability that the vehicle is indeed approaching a vehicle, pedestrian, or reflective object, the CPU 140a may send the signal to the ECU 140 to turn off the headlights. More detail regarding the probability determination based on multiple data inputs from various cameras, sensors, and system is provided in detail below.

Additionally, the images captured by the cameras 162 may be processed with object recognition software to detect certain objects of interest. By way of example, the cameras 162 may capture images and/or videos of the surrounding vehicle environment, which may include potential pedestrians, road signs, oncoming vehicles, preceding vehicles, and the like. The images and/or videos may then be processed by the CPU 140a, where they are then filtered with an object recognition software. To determine if any of the objects in the images and/or videos include objects of interest (e.g., pedestrians, road signs, oncoming vehicles, preceding vehicles, headlights, tail lights, and the like), the object recognition software may include a datastore with reference materials. By way of example, the reference materials may also include information regarding shapes, pixel intensities, lines, and other information that can be used to help further identify the objects of interest in the images and/or videos.

In the instance that the object of interest is identified by the object recognition software, the object recognition software may output a signal to the ECU 140 that a target object has been detected, such as the presence of an oncoming vehicle immediately ahead. Thus, when the target object has been identified by the ECU 140, the ECU 140 may turn off the high beam headlights.

There may also be a plurality of sensors connected to the I/O module 140d, where the sensors 164 may be used to detect various environmental, road, or driving conditions. By way of example, such sensors 164 may detect distance between vehicles (e.g. radar sensors), speed of current vehicle travel (e.g. accelerometer), light ray or reflected light ray detection (e.g., image sensors), object detection (e.g. radar sensors), motion detection (e.g., motion sensors), moisture detection (e.g., moisture detection sensors), steering handling detection (steering wheel sensors), and the like. The sensors alone or in combination with the camera, navigation system, and the communication system may be used to collect data in real time, which may then be processed by the CPU 140a. When the CPU 140a determines that the data from the sensors 164 indicate the likelihood of approaching such conditions requiring turning off the high beam headlights, the ECU 140 may then turn off the high beam headlights 120a/b accordingly.

In some instances, data from one of the sensors 164 alone may not be sufficient to indicate whether high beam headlights should be turned off, or if they can remain on. For example, a motion sensor from the vehicle may indicate the presence of a moving object ahead, and the data indicating presence of motion alone is insufficient to determine whether the moving object is a vehicle or simply a road sign or road feature. As a result, additional data may be needed to determine the likelihood that the moving object ahead is indeed that of another vehicle or a walking pedestrian ahead. As a result, the additional data may come from a camera, where the images taken with the use of an object recognition software may be able to detect whether the moving object ahead is likely a vehicle or a pedestrian. Thus, CPU 140a may receive the data from the motion sensors in combination with the camera 162, which may be factored to determine the likelihood the moving object ahead is a pedestrian or a moving vehicle. As a result, the ECU 140 may then turn off the high beam headlights 120a/b. It should be noted that the additional data may come from any of the other cameras, sensors, and systems that may help determine the likelihood of the vehicle encountering potential pedestrians or vehicles ahead.

The navigation system 166 may also be connected to the I/O module 140d. The navigation system 166 may include a navigation processor, a navigation adjustment component, and a GPS component. In some embodiments, the navigation processor may determine the location of vehicle in real time and determine the current and upcoming road and traffic conditions using a GPS component (which may include or be a GPS receiver). In some embodiments, navigation system 166 may receive information from third party service providers, such as current traffic information, and the like.

By way of example, the ECU 140 may be configured to automatically shut off the high beam when it detects that the vehicle is travelling in certain road or traffic conditions. For example, if the navigation system indicates that the vehicle will be approaching a curved stretch of road ahead, and the curved road is a threshold condition for turning off the high beam headlights, the ECU 140 may automatically shut off the high beam as the vehicle approaches the curve. Here, the data from the navigation system 166 alone may be sufficient to indicate the likelihood of exceeding a threshold condition, such as approaching a curved road.

However, in other instances, another threshold condition may need to be satisfied before the ECU 140 turns off the high beam headlights, such as requiring the vehicle to be within a predetermined distance from the curved portion of the road, or any other target object (e.g., pedestrian, road sign, vehicle). The distance threshold requirement may be implemented to prevent the high beam headlights from prematurely turning off. In some embodiments, the likelihood that other vehicles will be present once the vehicle rounds the curve may be determined using traffic information relevant to that region in which the vehicle is traveling.

By way of example, to detect the distance of the vehicle from the target object or target condition, the navigation system 166 may be able to detect the vehicle's current location information via the GPS component and GPS receiver and determine how far or close it is from the target road condition ahead. In one instance, the distance threshold requirement may be 600-700 ft., so that the ECU 140 turns off the high beam headlights when it receives data confirming that the vehicle is 600-700 ft. from the start of the curved section of road.

By way example, the communication system 168 may also be connected to the I/O module 140d. The communication system 168 may include telematic systems, such as on-board diagnostics (OBD) systems installed within vehicles, which may be configured to access vehicle computers and transmit vehicle data to the CPU 140a. In some instances, the communication system 168 may also include a Bluetooth system to enable communication between the vehicle and the driver's mobile phone. This may allow any data collected from a mobile device, such as location information, to be transmitted to the CPU 140a for data processing.

Additionally, the communication system 168 may also include vehicle-to-vehicle communication systems and/or vehicle-to-infrastructure communications systems, which can be used to share data and information amongst vehicles and/or data and information from roadside units. Shared data and information may include data collected by the vehicle, such as safety information, locations of curved or hilly sections of road, location of other vehicles, presence of upcoming of road signs, and the like.

Figure 2:
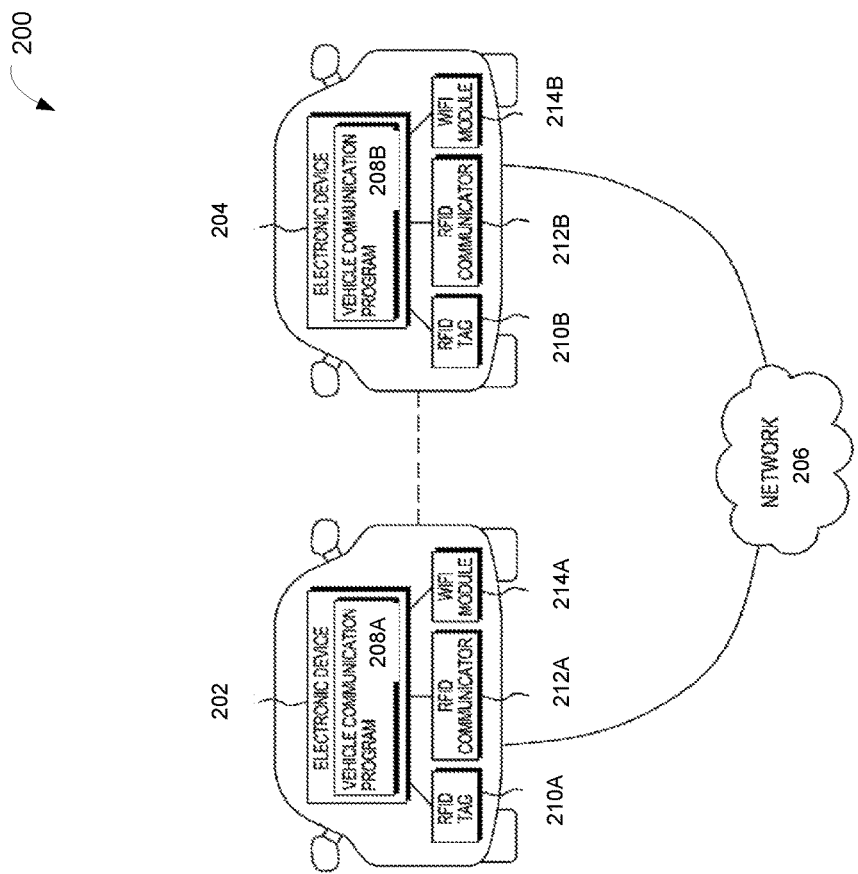
FIG. 2 is schematic representation of a vehicle communication system.

The communication system 168 is also depicted in FIG. 2, which is a schematic representation of a vehicle communication system 200. The distributed data processing environment may include an electronic device 202 and electronic device 204 interconnected over network 206. By way of example, the electronic devices 202 and 204 may be an ECU, a transmission control unit (TCU), an integrated vehicle computer, a laptop computer, a tablet computer, a smartphone, or any programmable electronic device capable of receiving at least inputs and communicating with other electronic devices, network 206, RFID tag 210A and 210B, RFID communicator 212A and 212B, and WIFI module 214A and 214B. The electronic device 202 may be located in a first vehicle and electronic device 204 may be located in a second vehicle.

A vehicle communication program 208A and 208B may each reside in electronic devices 202 and 204. The vehicle communication program 208 may have the ability to send and receive messages concerning safety, environment, road, and driving conditions. Additionally, the vehicle communication program 208A can determine whether electronic devices 204 with vehicle communication 208B is in the vicinity and then send the information.

RFID tag 210A and 210B may be radio-frequency identification tags which may respectively communicate with vehicle communication program 208A and 210B to provide vehicle information. In one embodiment, the vehicle information can include vehicle identification number, where communication program 208 may have the ability to determine information about the vehicle, such as the make and model of the vehicle. The RFID communicators 212A and 212B may communicate with communication program 208A and 208B to send messages, receive messages, and identify vehicle in the vicinity based on the RFID tags 110A and 110B.

In another embodiment, the Wi-Fi module 214A and 214B can respectively communication with vehicle communication program 208A and 208B. For example, the Wi-Fi module 214A and 214B allow vehicle communication programs 208A and 208B to send and receive messages between electronic devices 202 and 204. The Wi-Fi module 214A can be associated with a vehicle and Wi-Fi module 214B can be associated with another vehicle, where each Wi-Fi module 114 utilizes a unique IP address.

In general, network 206 can be any combination of connections and protocols that can support communications between electronic device 202 and 204. Network 206 can include, for example, a local area network (LAN), a wide area network (WAN), such as the internet, a cellular network, or the combination of the preceding, and can further include wired, wireless, and/or fiber optic connections.

Thus, by way of example, data gathered from the above mentioned cameras 162, sensors 164, and navigations system 166 may then be shared amongst the vehicles utilizing the communication system 168. In other words, data provided by the communication system 168 from other vehicles may then be factored and assessed to further help determine if the current conditions exceed any threshold conditions that result in the ECU 140 in turning off the high beam headlights.

For example, in one scenario, a first vehicle may not yet detect the lights from the headlight of an oncoming vehicle because the oncoming vehicle is too far away. However, if a second vehicle is preceding farther ahead where its cameras 162 are close enough to detect the lights from the oncoming vehicle, the data from the second vehicle's camera may be transmitted to the first vehicle via the vehicle communication programs 208A and 208B of the communication system 168. With the received data, the first vehicle may then be on alert that lights are approaching ahead, which the ECU 140 may likely characterize as potentially being headlights from an oncoming vehicle. But because light detection alone is not sufficient to determine the likelihood that it is from an oncoming vehicle, the ECU 140 may request additional data to determine the likelihood that the light are indeed from an oncoming vehicle. As such, the ECU 140 may require confirmation from its own cameras 162 where the object recognition software is able to confirm or deny the presence of an approaching vehicle. If object recognition software is able to detect the presence of a vehicle within a predetermined time frame from when light detection data was received from the second vehicle, a signal may be sent to the ECU 140. The signal may indicate that the approaching light ahead is likely from an oncoming vehicle, in which the ECU 140 may then turn off the high beam headlights.

Figure 3:
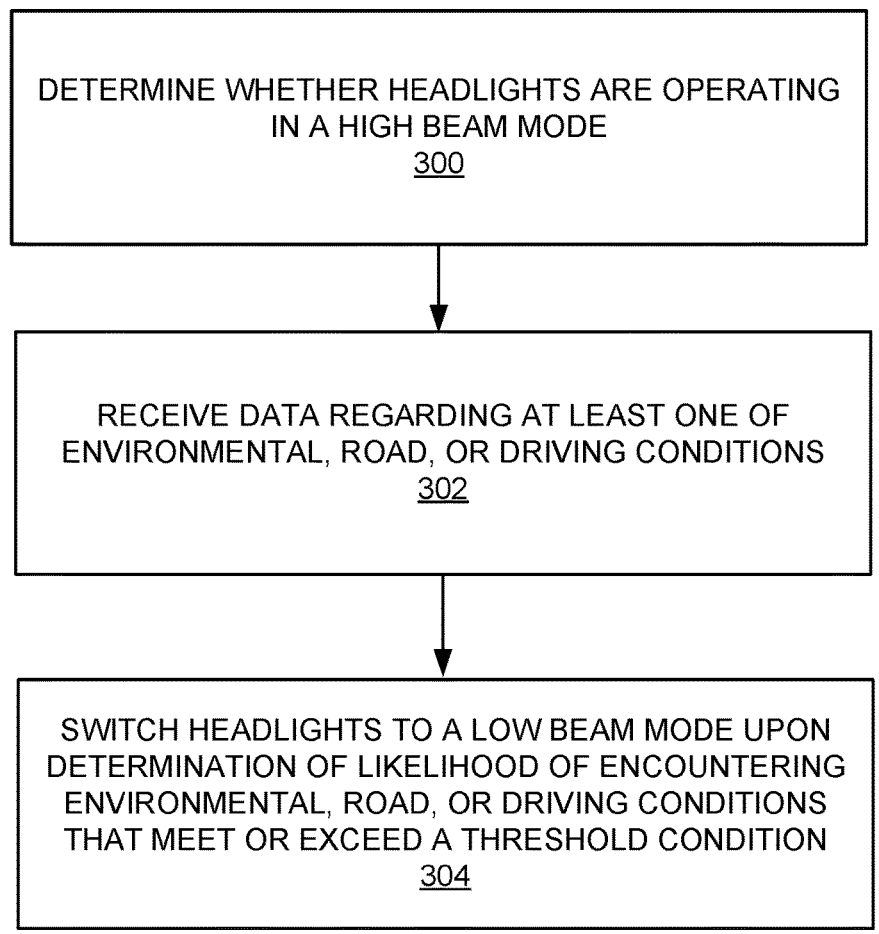
FIG. 3 is a an exemplary process for adjusting the high beam headlight operation in response to certain conditions in accordance with various embodiments.

FIG. 3 is a flow chart depicting an exemplary process for adjusting the high beam headlight operation in response to certain conditions in accordance to various embodiments. By way of example, the high beam headlights may already be turned on. When the vehicle gathers data that indicates the high likelihood of encountering oncoming or preceding vehicles, pedestrians, or reflective road signs ahead, the high beam headlights may be turned off. When the high beam headlights are turned off, the low beam headlights may then be switched on. Thus, determining the likelihood of encountering oncoming or preceding vehicles, pedestrians, or reflective road signs ahead may be determined by considering one or more environmental, road, or driving conditions.

In other instances, the high beam headlights may be turned on and when the vehicle encounters certain environmental, road, or driving conditions that do not indicate the probability of encountering oncoming or preceding vehicles, pedestrians, or reflective road signs ahead, the high beam headlights may remain turned on.

At operation 300, the process may include determining whether the high beam headlights are operating in a high beam mode. In some instances, the high beam headlights may be manually turned on by the driver. In other instances, the high beam headlights may be automatically turned on by the ECU when certain conditions are met. By way of example, such conditions may include, minimum detection of surrounding darkness, low vehicle speeds, failure to detect oncoming vehicles, failure to detect proceeding vehicles immediately in front, and failure to detect any pedestrians nearby.

At operation 302, the process may include receiving data from at least one of the approaching environmental, road, and driving conditions detected. The ECU may then receive data and perform a probability determination to determine whether the identified environmental, road, and/or driving conditions warrant the operation of switching to low beam headlights. By way of example, the data collected from various sensors, cameras, navigation systems, and communication systems mentioned above. The data may be collected to then identify a likelihood that at least one of the environmental condition, the road condition, and the driving condition warrants switching the headlights to a low beam mode upon a determination that the headlights are indeed operating in the high beam mode.

In some instances, the data may be collected from a camera and/or image sensor that may detect the measurable brightness or illuminance. The camera may capture images of the surrounding environment ahead of the vehicle, where the ECU may then identify pixels on the images to determine the presence or absence of light or reflective light. By way of example, when the pixel values ranging anywhere from 4 pixel to the max pixel of the camera 162 are detected, these values may be associated with the presence of a light source or reflected light. The camera and the image sensor may also detect for additional information to further determine the likelihood that the detected bright spots are indeed headlights, tail lights, or reflections bouncing back from reflective objects. By way of example, such information may include shape, brightness, spatial alignment and color of the detected bright spots. But because sensed light alone is insufficient to determine the likelihood that it is from a vehicle or reflective road sign, additional data will need to be collected. Thus, data collected from the camera and image sensor in combination with other data may be transmitted to the ECU to determine whether the sensed light is associated with the likelihood of encountering vehicles, pedestrians, or reflective road signs ahead.

The camera may also deliver images in real time and capture images in a series of image frames. In some embodiments, the images may also be processed by a recognition software to identify the presence or absence of any vehicles or road signs ahead. The recognition software may then analyze these images and detect for certain objects that are indicative of an environment requiring the high beam headlights to be turned off. Such objects may include, head lights, tail lights, persons, vehicles, road signs, and the like. Here, data from the object recognition software alone may be sufficient to determine the likelihood of encountering conditions resulting in the turning off the high beam headlights. For example, if the object recognition software detects and identifies taillights ahead, this data alone may be sufficient to indicate the presence of a vehicle ahead. However, in other instances, the data from the object recognition software also may be used in combination with other data to assure the likelihood of encountering vehicles, pedestrians, or reflective road signs ahead.

Furthermore, the camera may also include a thermographic camera, which may detect and capture images using infrared radiation. Because humans have body temperatures that range from 97.7 to 99.5 degrees Fahrenheit, the thermographic camera may be able to detect the likelihood of a nearby pedestrian when the thermographic camera identifies heat signatures near those ranges. Thus, the high beam ECU may be programmed with instructions where the identification of certain body temperature ranges, such as 97.7 to 99.5 degrees Fahrenheit, is indicative of the likelihood of a pedestrian being nearby.

As a result, the ECU may shut off the high beam headlights when the predetermined threshold ranges for body temperature are detected. In other instances, the detection of the predetermined threshold range for body temperature and other additional data may be required to confirm the likelihood of a pedestrian presence. For example, an image shot filtered with object recognition software confirming presence of a pedestrian up ahead may be utilized to confirm that the detected heat radiating object with heat signatures characteristic of a human is indeed a pedestrian.

Furthermore, data from motion sensors may also be utilized to further help determine the presence of nearby vehicles and pedestrians. For example, various motion sensors may detect for various motion around the surrounding areas of the vehicle. By way of example, the motion sensor may include a radar sensor to detect objects within the vicinity of the vehicle. Additionally, the motion sensor may also detect for objects passing by the vehicle's left and ride side, which may indicate the likelihood that another vehicle is approaching and attempting to pass by the driver. Because the passing vehicle will then be in the high beam headlight's glare once in front of the driver, the motion sensor may signal the high beam ECU to turn off the high beam headlights when it detects a moving object along the sides of the vehicle. To confirm the likelihood that the moving object is indeed a passing vehicle, cameras may take images and/or videos of the moving object and use recognition software to identify the object as a vehicle. Thus, additional data be used to factor the likelihood that the vehicle is or will encounter a vehicle, pedestrian, or reflective object ahead.

Additionally, data from a motion sensor may also be used to help determine the likelihood that the moving object ahead is a pedestrian. Thus, the motion sensor may be used in combination with the other cameras, sensors, and devices as discussed above to confirm the likelihood that the detected motion is a moving pedestrian immediately ahead (e.g., motion camera may indicate moving object ahead and a camera paired with recognition software may confirm the likelihood that the object is a person crossing the street).

Furthermore, road condition data may also be collected. Because curved roads or hilly conditions make it very difficult to detect the presence of oncoming vehicles or preceding vehicles immediately ahead, detecting such road conditions may be a threshold condition that results in the high beam ECU to automatically turn off the high beam headlights. By way of example, road condition information may be provided by the navigation system, where the map data associated with the proscribed route may detect current and upcoming road conditions. For example, when the navigation system indicates that a sharp curve is coming up ahead in 300 ft., such data may be sent to the high beam ECU for data processing.

Additionally, cameras and sensors may also be utilized to determine the likelihood that the vehicle is currently on curved and hilly road conditions. For example, data from the camera feed and the object recognition software may identify road signs that indicate the curved road conditions ahead. Additionally, sensors, such as a steering wheel sensor, which may detect the steering direction and angle of the steering wheel. Thus, detected data may then be sent to the high beam ECU to consider the likelihood that the vehicle is travelling on curved or hilly road conditions based on one or more data inputs from the various cameras, sensors, and systems described herein.

Furthermore, it should also be noted that data from the vehicle's communication system may also be utilized and collected to determine the likelihood of approaching a vehicle, pedestrian, or road sign. The data may come from the vehicle-to-vehicle communication system, where nearby vehicles may be in communication with the driver's vehicle to provide upcoming environmental, road, and/or driving condition information. By way of example, a vehicle ahead may detect curved road conditions and may communicate with another vehicle further behind of the upcoming road conditions. The data received from the vehicle's communication system (e.g., vehicle-to-vehicle communication system) may be sent to the ECU, where other additional data may also be considered to determine the likelihood that the vehicle is indeed approaching a curved or hilly section of the road. For example, data from the vehicle's navigation system may also be sent to the ECU, where the navigation system may then confirm the upcoming road condition as indicated by the received data from the vehicle-to-vehicle communication system.

Additionally, driving behavior may also be detected, where the corresponding driving behavior data may also be sent to the high beam ECU. By way of example, such data may come from a sensor detecting the depression level of the accelerometer pedal and the brake pedal to detect vehicle speed. By way of example, the degree at which the accelerator is depressed may translate the speed and rate of acceleration the driver is attempting to carry out. Thus, the minimum speed threshold may be determined so that when the vehicle surpasses that threshold, the ECU associates such speeds with the likelihood that the vehicle is not traveling on curved or hilly road conditions. By way of example, the high beam ECU may be programmed to associate surpassing 5 mph as indicating the likelihood that the vehicle is traveling on a curved or hilly road condition. This speed data may be sent to the high beam ECU in combination with other data provided by the camera, navigation system, or other sensors to determine the likelihood that the vehicle is indeed travelling on curved or hilly sections of the road.

By way of another example, speed may be used to determine the likelihood that pedestrians may be approaching ahead. For example, if a vehicle is continuously decelerating, this may indicate that the vehicle is nearing a stop sign or signal, where other approaching vehicles or pedestrians may likely be present. In other instances, where the vehicle is continuously accelerating or cruising at fairly high speeds, such as speeds of 45 mph or higher, this likely indicates that the vehicle is on a long stretch of road, such as a highway. Because highways do not have a pedestrian walk way and encountering pedestrians are very rare, speed may be an indicator of the likelihood of approaching a pedestrian on an urban street. By way of example, the high beam ECU may be programmed such that driving at speeds within the threshold range of 5-45 mph indicates the likelihood of approaching a pedestrian or other objects, such as a preceding vehicle stopped at an intersection and a road sign at the intersection.

Additionally, distance may be considered to determine the timing at which to turn off the high beam headlights. By way of example, the camera or sensors described above may detect the presence of nearby vehicles or pedestrians. However, they may be far enough where the high beam headlights are not close enough to produce headlight glare to the other drivers and the pedestrians. As a result, distance may be an additional factor to be considered with the above mentioned sensors, cameras, navigation systems, and communication systems.

For example, if the cameras or sensors detect a pedestrian crossing the street 1000 ft. ahead, the ECU may be programmed such that the high beam headlights turn off when the vehicle is within a predetermined distance range from the detected object of interest (e.g., vehicles, pedestrians, road signs). By way of example, the predetermined distance range may be 600-700 ft.

At operation 304, the high beam headlights may be switched to a low beam mode upon a determination of the likelihood of at least one of the environmental condition, the road condition, and the driving condition meets or exceeds a threshold condition.

Figure 4:
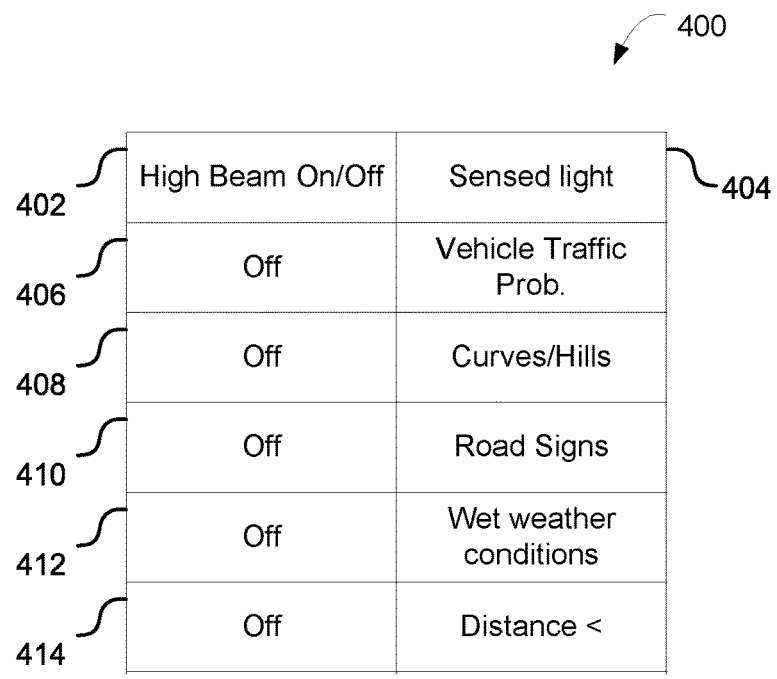
FIG. 4 is a table providing the variable combinations of environmental, road, and driving conditions that result in specific adjustment to the high beam headlight operation.

FIG. 4 is a table providing the variable combinations of environmental, road, and driving conditions that result in specific adjustment to the high beam headlight operation. Table 400 may be represented by a generic function that helps determine whether the vehicle's detection of certain environmental, road, or driving conditions reflect the likelihood of approaching oncoming or preceding vehicles, pedestrians, or reflective road signs. By way of example only, the generic function may be dependent upon two different variables, where the variables may be any one of the environmental, road, or driving conditions discussed above (e.g., weather, vehicle traffic, pedestrian traffic, presence of road signs, presence of reflective objects, presence of reflected light, presence of light, curved or hilly road conditions, vehicle speed, and vehicle distance). In one embodiment, one of the variables may be illuminance, which indicates the presence or absence of sensed light. The second variable may be any one of the environment, road, or driving conditions discussed. The function may be represented as the following formula provided below:

High beam Headlight Operation= (Illumiance Variable) (Environmental Condition Variable / Road COndition Variable / Driving Condition Variable):

As further indicated by the formula, the illuminance variable may be always considered with respect to high beam headlight operation. This is because the presence and detection of light is an important factor that may have the greatest impact when determining the likelihood of encountering conditions that result in the turning off of the high beam headlights (e.g., oncoming or preceding vehicles and road signs).

However, while sensed light is an important factor, additional variables may need to be determined because the detection of light alone may be insufficient to determine the source of the light. As such, in some instances, a second variable of the high beam headlight operation function may be required to confirm that the sensed light is indeed likely from an oncoming or preceding vehicle or from a reflective object, such as a road sign.

As provided in the exemplary table 400, the table may indicate the instructions for the ECU, which may indicate whether the high beam headlights should be turned off based on the currently detected conditions. For example, at exemplary high beam headlight condition 406, when the vehicle senses light 404 detected from the cameras or image sensors and also vehicle traffic detected ahead, the corresponding data may be sent to the ECU for data processing. By way of example, vehicle traffic may be detected by the navigation system or communication system as explained above in detail. When both data sets are identified by the ECU within a set time frame, the ECU may determine that the sensed light ahead is likely from the headlights and/or tail lights from the indicated vehicles ahead. As a result, because the probability of encountering vehicles is likely based on the provided data, the ECU may send a signal to automatically turn off the high beam headlights.

At exemplary high beam headlight condition 408, a vehicle may sense light 404 Thus, to prevent potentially blinding any drivers as the vehicle with the high beam headlights, the ECU may be configured to turn off the high beam headlights when it detects the curved or hilly sections of road. Thus, in some instances, even without the presence of detected light, satisfying only the road condition variable may be sufficient to automatically turn off the high beam headlights.

At exemplary high beam headlight condition 410, when the vehicle detects sensed light 404 and the detection of a reflective object, such as a road sign, the data may be transmitted to the ECU. But because the sensed light 404 alone is insufficient to determine whether it is a high beam headlight reflecting back after hitting a reflective road sign, additional data may be required. Thus, when the camera with the object recognition software detects the presence of a road sign up ahead, the data from the camera may then be transmitted to the ECU. The ECU may process this data and determine that data supports the likelihood that the sensed light is a reflected high beam headlight bouncing back after hitting a reflective road sign ahead. Because reflected high beam headlight will produce glare to the driver, the ECU may then turn off the high beam headlight off.

At exemplary high beam headlight condition 412, the vehicle may sense light 404 and detect specific weather conditions, such as wet weather conditions (e.g., snow, rain, fog). The presence of wet weather conditions may be detected by the vehicle's moisture detection sensors, navigation system, and communication system as described above in detail.

Again, sensed light 404 alone is insufficient to determine its source. As a result, the ECU will require additional data to determine if the light is associated with conditions that require the high beam headlights to be turned off. As a result, when the additional data gathered indicates that the current weather conditions include rain, snow, or fog, the ECU may determine that sensed light is a result of the high beam headlights being reflected from the water droplets in the air. Thus, when the ECU determines that the vehicle is driving in wet weather conditions based and likely causing the high beam headlights to be reflected from the moisture in the air, the ECU may turn off the high beam headlights.

At exemplary high beam condition 414, when there is sensed light 404 and the detection of an object at a select predetermined distance from the vehicle, the high beam ECU may instruct the high beam headlights to turn off. In the instance that the object is already determined to be a vehicle, pedestrian, or a road sign, distance may be a factor for consideration because the vehicle, pedestrian, or road sign may be too far away from the high beam headlights to cause glare at such distances. Thus, in order to prevent the high beam headlights from prematurely turning off, distance may be considered. By way of example, the predetermined distance may be at 600-700 ft, so that the high beam headlights turn off when within 600-700 ft. of the identified vehicle, pedestrian, or the reflective object ahead. By way of example, a radar sensor may be used to determine the distance between the vehicle with the high beam headlights and the other vehicle or reflective object ahead.

Thus when the first and second variables are detected simultaneously, or in near simultaneous timing, the two detected variables may be considered in accordance to the chart reflected in the figure. It should be noted that the high beam headlight operation may be a function that may be dependent on one variable or dependent on two or more variables.

Figure 5:
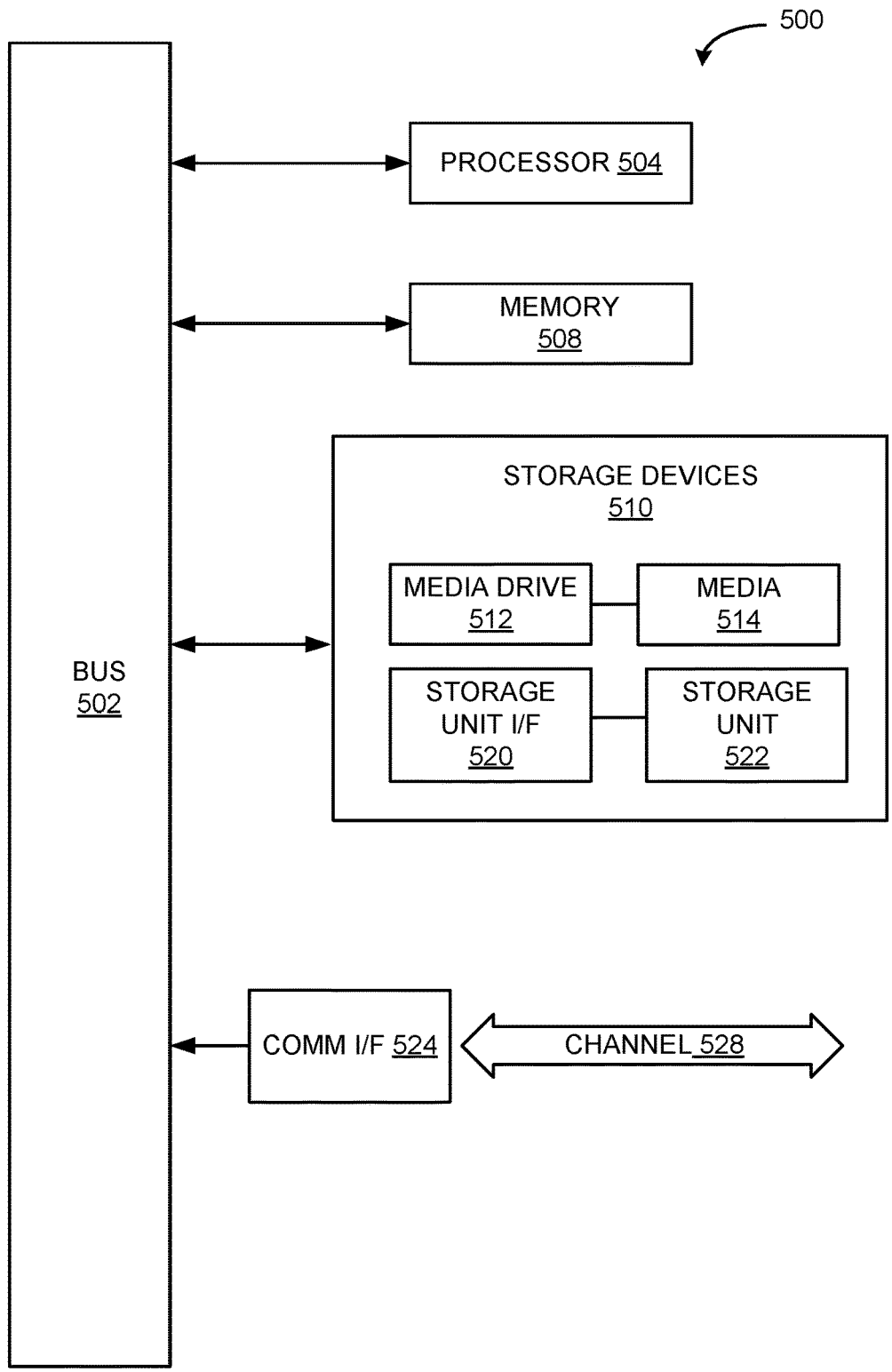
FIG. 5 is an example computing component that may be used to implement various features of embodiments described in the present disclosure.

As used herein, a component might be implemented utilizing any form of hardware, software, or a combination thereof. For example, one or more processors, controllers, ASICs, PLAs, PALs, CPLDs, FPGAs, logical components, software routines or other mechanisms might be implemented to make up a component. Various components described herein may be implemented as discrete components or described functions and features can be shared in part or in total among one or more components. In other words, as would be apparent to one of ordinary skill in the art after reading this description, the various features and functionality described herein may be implemented in any given application. They can be implemented in one or more separate or shared components in various combinations and permutations. Although various features or functional elements may be individually described or claimed as separate components, it should be understood that these features/functionality can be shared among one or more common software and hardware elements. Such a description shall not require or imply that separate hardware or software components are used to implement such features or functionality.

Where components are implemented in whole or in part using software, these software elements can be implemented to operate with a computing or processing component capable of carrying out the functionality described with respect thereto. One such example computing component is shown in FIG. 5. Various embodiments are described in terms of this example-computing component 500. After reading this description, it will become apparent to a person skilled in the relevant art how to implement the application using other computing components or architectures.

Referring now to FIG. 5, computing component 500 may represent, for example, computing or processing capabilities found within a self-adjusting display, desktop, laptop, notebook, and tablet computers. They may be found in hand-held computing devices (tablets, PDA's, smart phones, cell phones, palmtops, etc.). They may be found in workstations or other devices with displays, servers, or any other type of special-purpose or general-purpose computing devices as may be desirable or appropriate for a given application or environment. Computing component 500 might also represent computing capabilities embedded within or otherwise available to a given device. For example, a computing component might be found in other electronic devices such as, for example, portable computing devices, and other electronic devices that might include some form of processing capability.

Computing component 500 might include, for example, one or more processors, controllers, control components, or other processing devices. This can include a processor, and/or any one or more of the components making up navigation system 514 and its component parts, navigation server/network 524, and controller 550. Processor 504 might be implemented using a general-purpose or special-purpose processing engine such as, for example, a microprocessor, controller, or other control logic. Processor 504 may be connected to a bus 502. However, any communication medium can be used to facilitate interaction with other components of computing component 500 or to communicate externally.

Computing component 500 might also include one or more memory components, simply referred to herein as main memory 508. For example, random access memory (RAM) or other dynamic memory, might be used for storing information and instructions to be executed by processor 504. Main memory 508 might also be used for storing temporary variables or other intermediate information during execution of instructions to be executed by processor 504. Computing component 500 might likewise include a read only memory ("ROM") or other static storage device coupled to bus 502 for storing static information and instructions for processor 504.

The computing component 500 might also include one or more various forms of information storage mechanism 510, which might include, for example, a media drive 512 and a storage unit interface 520. The media drive 512 might include a drive or other mechanism to support fixed or removable storage media 614. For example, a hard disk drive, a solid state drive, a magnetic tape drive, an optical drive, a compact disc (CD) or digital video disc (DVD) drive (R or RW), or other removable or fixed media drive might be provided. Storage media 514 might include, for example, a hard disk, an integrated circuit assembly, magnetic tape, cartridge, optical disk, a CD or DVD. Storage media 514 may be any other fixed or removable medium that is read by, written to or accessed by media drive 512. As these examples illustrate, the storage media 514 can include a computer usable storage medium having stored therein computer software or data.

In alternative embodiments, information storage mechanism 510 might include other similar instrumentalities for allowing computer programs or other instructions or data to be loaded into computing component 500. Such instrumentalities might include, for example, a fixed or removable storage unit 522 and an interface 520. Examples of such storage units 522 and interfaces 520 can include a program cartridge and cartridge interface, a removable memory (for example, a flash memory or other removable memory component) and memory slot. Other examples may include a PCMCIA slot and card, and other fixed or removable storage units 522 and interfaces 520 that allow software and data to be transferred from storage unit 522 to computing component 500.

Computing component 500 might also include a communications interface 524. Communications interface 524 might be used to allow software and data to be transferred between computing component 500 and external devices. Examples of communications interface 524 might include a modem or softmodem, a network interface (such as an Ethernet, network interface card, WiMedia, IEEE 802.XX or other interface). Other examples include a communications port (such as for example, a USB port, IR port, RS232 port Bluetooth® interface, or other port), or other communications interface. Software/data transferred via communications interface 524 may be carried on signals, which can be electronic, electromagnetic (which includes optical) or other signals capable of being exchanged by a given communications interface 524. These signals might be provided to communications interface 524 via a channel 528. Channel 528 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to transitory or non-transitory media. Such media may be, e.g., memory 508, storage unit 520, media 514, and channel 528. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing component 500 to perform features or functions of the present application as discussed herein.

It should be understood that the various features, aspects and functionality described in one or more of the individual embodiments are not limited in their applicability to the particular embodiment with which they are described. Instead, they can be applied, alone or in various combinations, to one or more other embodiments, whether or not such embodiments are described and whether or not such features are presented as being a part of a described embodiment. Thus, the breadth and scope of the present application should not be limited by any of the above-described exemplary embodiments.

Terms and phrases used in this document, and variations thereof, unless otherwise expressly stated, should be construed as open ended as opposed to limiting. As examples of the foregoing, the term "including" should be read as meaning "including, without limitation" or the like. The term "example" is used to provide exemplary instances of the item in discussion, not an exhaustive or limiting list thereof. The terms "a" or "an" should be read as meaning "at least one," "one or more" or the like; and adjectives such as "conventional," "traditional," "normal," "standard," "known." Terms of similar meaning should not be construed as limiting the item described to a given time period or to an item available as of a given time. Instead, they should be read to encompass conventional, traditional, normal, or standard technologies that may be available or known now or at any time in the future. Where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "component" does not imply that the aspects or functionality described or claimed as part of the component are all configured in a common package. Indeed, any or all of the various aspects of a component, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:

1. A method comprising:
    determining whether headlights are operating in a high beam mode;
    receiving data regarding at least one of an environmental condition, a road condition, and a driving condition from one or more cameras, sensors, and information systems associated with a vehicle;
    identifying a likelihood that at least one of the environmental condition, the road condition, and the driving condition warrants switching the headlights to a low beam mode upon a determination that the headlights are operating in the high beam mode; and
    switching the headlights to the low beam mode upon a determination that the likelihood of the at least one of the environmental condition, the road condition, and the driving condition warranting switching the headlights to the low beam mode meets or exceeds a threshold condition.

2. The method of claim 1, wherein the environmental condition comprises at least one of wet weather, vehicle traffic, pedestrian traffic, road signs, reflective objects, light rays, and reflected light rays.

3. The method of claim 1, wherein the road condition comprises a curved or hilly section of road.

4. The method of claim 1, wherein the driving condition comprises one or more objects within 600-700 feet in front of or alongside the vehicle.

5. The method of claim 4, wherein the object comprises a reflective object, an oncoming vehicle, and a preceding vehicle.

6. The method of claim 1, wherein the cameras comprise at least one of a still camera, a video camera, and a thermographic camera.

7. The method of claim 1, wherein the sensors comprise at least one of a radar sensor, a motion detection sensor, a light sensor, a steering wheel sensor, and a moisture detection sensor.

8. The method of claim 1, wherein the information systems comprise at least one of a navigation system, a Bluetooth system, a vehicle-to-infrastructure communication system, and a vehicle-to-vehicle communication system.

9. The method of claim 1, wherein the threshold condition comprises a condition in which light is sensed by the vehicle in conjunction with the at least one of the environmental condition, road condition, and driving condition.

10. A system, comprising:
    a pair of headlights comprising a high beam mode and a low beam mode;
    an electronic control unit for adjusting the operation of the headlights, where the electronic control unit:
        detects whether headlights are operating in a high beam mode;
        receives data regarding at least one of an environmental condition, a road condition, and a driving condition from one or more cameras, sensors, and information systems associated with a vehicle;
        identify a likelihood that at least one of the environmental condition, the road condition, and the driving condition warrants switching the headlights to a low beam mode upon a determination that the headlights are operating in the high beam mode; and
        switch headlights to the low beam mode upon a determination that the likelihood of at least one of the environmental condition, the road condition, and the driving condition warranting switching the headlights to the low beam mode meets or exceeds a threshold condition.

11. The system of claim 10, wherein the environmental condition comprises at least one of wet weather, vehicle traffic, pedestrian traffic, road signs, reflective objects, light rays, and reflected light rays.

12. The system of claim 10, wherein the road condition comprises a curved or hilly section of road.

13. The system of claim 10, wherein the driving condition comprises a distance between the vehicle and an object within a range of 600-700 feet, wherein the object comprises at least one of a reflective object, an oncoming vehicle, and a preceding vehicle.

14. The system of claim 10, wherein the cameras comprise at least one of a still camera, a video camera, and a thermographic camera.

15. The system of claim 10, wherein the sensors comprise at least one of a radar sensor, a motion detection sensor, a light sensor, a steering sensor, and a moisture detection sensor.

16. The system of claim 10, wherein the information systems comprise at least one of a navigation system, a Bluetooth system, and vehicle-to-infrastructure communication system, and a vehicle-to-vehicle communication system.

17. The system of claim 12, wherein the threshold condition comprises a condition in which light is sensed by the vehicle in conjunction with the at least one of the environmental condition, road condition, and driving condition.

* * * * *